United States Patent
Fujita et al.

(10) Patent No.: US 11,951,695 B2
(45) Date of Patent: Apr. 9, 2024

(54) METHOD FOR PRODUCING FIBER-REINFORCED PLASTIC

(71) Applicant: Toray Industries, Inc., Tokyo (JP)

(72) Inventors: Yuzo Fujita, Ehime (JP); Kentaro Adachi, Ehime (JP); Takuya Karaki, Ehime (JP)

(73) Assignee: Toray Industries, Inc., Tokyo (JP)

( * ) Notice: Subject to any disclaimer, the term of this patent is extended or adjusted under 35 U.S.C. 154(b) by 714 days.

(21) Appl. No.: 16/482,434

(22) PCT Filed: Jan. 19, 2018

(86) PCT No.: PCT/JP2018/001527
§ 371 (c)(1),
(2) Date: Jul. 31, 2019

(87) PCT Pub. No.: WO2018/142962
PCT Pub. Date: Aug. 9, 2018

(65) Prior Publication Data
US 2020/0001550 A1    Jan. 2, 2020

(30) Foreign Application Priority Data
Feb. 2, 2017    (JP) .................................. 2017-017328

(51) Int. Cl.
*B29C 70/30* (2006.01)
*B29C 43/34* (2006.01)
(Continued)

(52) U.S. Cl.
CPC ............. *B29C 70/30* (2013.01); *B29C 43/34* (2013.01); *B29C 70/34* (2013.01); *B29C 70/46* (2013.01); *B32B 5/10* (2013.01); *B32B 37/02* (2013.01)

(58) Field of Classification Search
None
See application file for complete search history.

(56) References Cited

U.S. PATENT DOCUMENTS

| 4,875,962 A * | 10/1989 | Breakspear ............. B29C 70/30 156/289 |
| 8,840,988 B2 | 9/2014 | Wohlmann et al. |

(Continued)

FOREIGN PATENT DOCUMENTS

| JP | 2009292002 A | 12/2009 |
| JP | 2010018724 A | 1/2010 |

(Continued)

OTHER PUBLICATIONS

FrogTape, How to Paint a Chalkboard using Chalkboard Paint, May 29, 2012, YouTube, found at: https://www.youtube.com/watch?v=QOv_q4EFvXs), hereinafter FrogTape (Year: 2012).*

(Continued)

*Primary Examiner* — Jacob T Minskey
*Assistant Examiner* — Caroline Beha
(74) *Attorney, Agent, or Firm* — Buchanan Ingersoll & Rooney PC

(57) ABSTRACT

Provided are methods for producing a fiber-reinforced plastic having high mechanical properties and high productivity during molding of a complicated shape.
In one aspect, the method produces a fiber-reinforced plastic using a tape substrate A and a sheet substrate B, the tape substrate A being a tape-shaped substrate including one or more sheets of incised prepreg a; the incised prepreg a being a prepreg including unidirectionally oriented reinforcing fibers and a resin and having a plurality of incisions dividing the reinforcing fibers formed in the prepreg, and satisfying the following condition 1; the sheet substrate B being a substrate including randomly oriented reinforcing fibers and a resin. In another aspect, the method for producing a fiber-reinforced plastic includes: a placement step \ (A) of placing a plurality of tape substrates A on a mold such that each of the sheet substrates A forms an overlapping portion in which the sheet substrate A overlaps one or more other sheet substrates A and a non-overlapping portion in which the sheet substrate A does not overlap any other sheet (Continued)

substrates A, a placement step (B) of placing a sheet substrate B, and a molding step of heating and pressing the tape substrates A and the sheet substrate B placed.
Condition 1 is: the average length xa of the incisions and the average length ya of the reinforcing fibers divided by the incisions satisfy ya>6.0xa+10.

10 Claims, 4 Drawing Sheets

(51) Int. Cl.
*B29C 70/34* (2006.01)
*B29C 70/46* (2006.01)
*B32B 5/10* (2006.01)
*B32B 37/02* (2006.01)

(56) References Cited

U.S. PATENT DOCUMENTS

2002/0044331 A1\* 4/2002 Agrawal ............ H01M 14/005
 359/254
2002/0119279 A1\* 8/2002 Ogawa ................ B82Y 30/00
2014/0272243 A1\* 9/2014 Sato .................... B29C 66/8322
 264/249
2015/0047151 A1\* 2/2015 Masini ..................... E05D 1/02
 264/261
2017/0190123 A1\* 7/2017 Tomioka ................ B29C 70/48

FOREIGN PATENT DOCUMENTS

| | | | |
|---|---|---|---|
| JP | 2010030193 A | | 2/2010 |
| JP | 5292972 B2 | * | 9/2013 |
| JP | 2013176876 A | | 9/2013 |
| JP | 2013544310 A | | 12/2013 |
| JP | 2014172267 A | | 9/2014 |
| JP | 2015051630 A | | 3/2015 |
| JP | 2017119432 A | | 7/2017 |

OTHER PUBLICATIONS

International Search Report and Written Opinion for International Application No. PCT/JP2018/001527, dated Mar. 6, 2018—4 pages.

\* cited by examiner

METHOD FOR PRODUCING FIBER-REINFORCED PLASTIC

CROSS REFERENCE TO RELATED APPLICATIONS

This is the U.S. National Phase application of PCT/JP2018/001527, filed Jan. 19, 2018, which claims priority to Japanese Patent Application No. 2017-017328, filed Feb. 2, 2017, the disclosures of these applications being incorporated herein by reference in their entireties for all purposes.

FIELD OF THE INVENTION

The present invention relates to a fiber-reinforced plastic having high productivity and high mechanical properties.

BACKGROUND OF THE INVENTION

Fiber-reinforced plastics made of reinforcing fibers and a resin have high specific strength and high specific modulus as well as excellent mechanical properties and high functional properties such as weather resistance and chemical resistance, and accordingly, fiber-reinforced plastics have received a wide attention as materials for industrial use such as structural elements of aircraft, spacecraft, motor vehicles, railways, ships, electric appliances, and sport gear, and their demands are increasing year by year.

Methods of productively producing a fiber-reinforced plastic include press molding using an SMC (sheet mold compound) in which discontinuous reinforcing fiber bundles impregnated with a resin are randomly oriented. However, since fiber-reinforced plastics in which discontinuous reinforcing fibers are randomly oriented are often insufficient in rigidity, a molding method has been developed to increase the rigidity by combining with continuous fibers (for example, Patent Document 1 and Patent Document 2). Such combination can minimize the use of high-cost continuous fiber materials and produce rigid fiber-reinforced plastics according to the purpose.

PATENT DOCUMENTS

Patent Document 1: Japanese Patent Laid-open Publication No. 2013-176876
Patent Document 2: Japanese Translation of PCT International Publication No. 2013-544310

SUMMARY OF THE INVENTION

However, in reinforcement using continuous fibers as in Patent Document 1 or Patent Document 2, when forming a member having a complicated shape, wrinkles are generated due to stretching of reinforcing fibers, and irregularities may remain, or resin defect may occur.

Accordingly, an object of the present invention is to provide a method for productively producing a fiber-reinforced plastic having an excellent complicated shape and being capable of exhibiting high mechanical properties.

To solve this problem, the present invention provides the following method for producing a fiber-reinforced plastic.
1) A method for producing a fiber-reinforced plastic using a tape-shaped substrate A and a sheet substrate B,
the tape-shaped substrate A being a tape-shaped substrate including one or more sheets of incised prepreg a; the incised prepreg a being a prepreg including unidirectionally oriented reinforcing fibers and a resin and having a plurality of incisions dividing the reinforcing fibers formed in the prepreg, and satisfying the following condition 1;
the sheet substrate B being a substrate including randomly oriented reinforcing fibers and a resin; and the method for producing a fiber-reinforced plastic including:
a placement step (A) of placing a plurality of tape-shaped substrates A on a mold such that each of the sheet substrates A forms an overlapping portion in which the sheet substrate A overlaps one or more other sheet substrates A and a non-overlapping portion in which the sheet substrate A does not overlap any other sheet substrates A, a placement step (B) of placing a sheet substrate B, and a molding step of heating and pressing the tape-shaped substrates A and the sheet substrate B placed,
(Condition 1)
the average length xa (mm) of the incisions and the average length ya (mm) of the reinforcing fibers divided by the incisions satisfy ya>6.0xa+10.
2) A method for producing a fiber-reinforced plastic using a tape-shaped substrate A and a sheet substrate C, the tape-shaped substrate A being a tape-shaped substrate including one or more sheets of incised prepreg a;
the incised prepreg a being a prepreg including unidirectionally oriented reinforcing fibers and a resin and having a plurality of incisions dividing the reinforcing fibers formed in the prepreg, and satisfying the following condition 1;
the sheet substrate C being a substrate including one or more sheets of incised prepreg c;
the incised prepreg c being a prepreg including unidirectionally oriented reinforcing fibers and a resin and having a plurality of incisions dividing the reinforcing fibers formed in the prepreg, and satisfying the following condition 2; and
the method for producing a fiber-reinforced plastic including:
a placement step (A) of placing a plurality of tape-shaped substrates A on a mold such that each of the sheet substrates A forms an overlapping portion in which the sheet substrate A overlaps one or more other sheet substrates A and a non-overlapping portion in which the sheet substrate A does not overlap any other sheet substrates A, a placement step (C) of placing a sheet substrate C, and a molding step of heating and pressing the tape-shaped substrates A and the sheet substrate C placed,
(Condition 1)
the average length xa (mm) of the incisions and the average length ya (mm) of the reinforcing fibers divided by the incisions satisfy ya>6.0xa+10.
(Condition 2)
the average length xc (mm) of the incisions and the average length yc (mm) of the reinforcing fibers divided by the incisions satisfy yc≤6.0xc+10.

In the following, the invention described in 1) is referred to as the present invention 1, the invention described in 2) is referred to as the present invention 2, and the present invention 1 and the present invention 2 are collectively referred to as the present invention.

According to the present invention, it is possible to provide a method for productively producing a fiber-reinforced plastic having a complicated shape and high mechanical properties.

DETAILED DESCRIPTION OF EMBODIMENTS OF THE INVENTION

Figure 1:
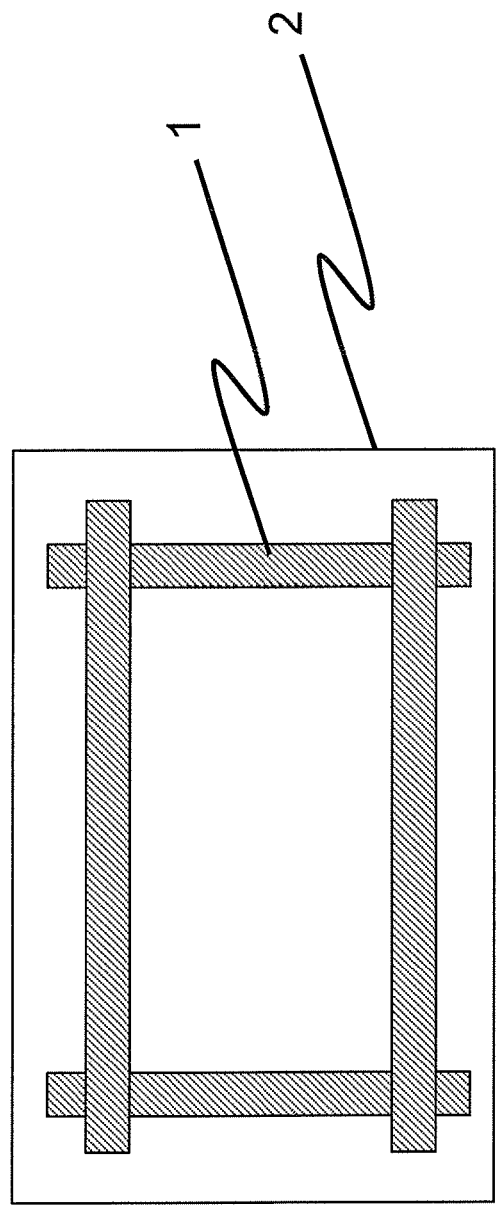
FIG. 1 is an example of a placement of a tape-shaped substrate A and a sheet substrate B

The present inventors diligently studied in order to provide a method for producing a fiber-reinforced plastic, the method being capable of productively producing a fiber-reinforced plastic that has a complicated shape and can exhibit high mechanical properties. Then, such a problem has been solved by devising a method for producing a fiber-reinforced plastic using a mold, the method including a placement step (A) of placing a plurality of tape-shaped substrates A on a mold, a placement step (B) of placing a sheet substrate B, and a molding step of heating and pressing as will be described later. Thanks to the use, as a base material, of a sheet substrate B being good in conformability to a complicated shape and good in productivity as well as the design of a tape-shaped substrate A, which supplements mechanical properties, to have shape conformability and be in such a simple shape as capable of being quickly placed on a mold, the mechanical properties are improved without reducing the productivity. A complicated shape refers to a shape having a three-dimensional shape. The factors for forming the three-dimensional shape include, but are not limited to, surface irregularities, bending in the out-of-plane direction of the substrate lamination surface, thickness variation, ribs, bosses, etc. Further, even in the case of a two-dimensional shape, it is included in the complicated shape if its front view produced by projecting the member has five or more corners on the edge thereof.

The tape-shaped substrate A in the present invention is a tape-shaped substrate including one or more incised prepregs a. The incised prepreg a is a prepreg including unidirectionally oriented reinforcing fibers and a resin, having a plurality of incisions dividing the reinforcing fibers formed in the prepreg, and satisfying the condition 1 described below. The tape-shaped substrate A is a tape-shaped substrate including one or more incised prepregs a as described above, and it is preferably a tape-shaped substrate including a plurality of incised prepregs a.

Herein, the tape-shape means a shape having a parallelogram shape in which the length of longer sides is twice or more the length of shorter sides. It is noted that each side may not necessarily be a straight line and may have a curved portion. When a side has a curved portion, the length of the line segment connecting both ends of the side is taken as the length of the side. The length of the longer sides is not particularly limited as long as it is at least twice the length of the shorter sides, but it is preferable that the length of the longer sides be 100 or less times the length of the shorter sides because the handleability may be deteriorated if the longer sides are excessively long relative to the shorter sides.

In the present invention, the tape-shaped substrate A plays a role of reinforcing the mechanical properties of the sheet substrate B, which serves as a base material, but when forming a shape having a complicated shape using a unidirectional prepreg having no incisions and at the time of making the prepreg conform to a mold during a molding step, it cannot conform in shape, and if a puddle of resin is formed or wrinkles are generated between the mold and the unidirectional prepreg, mechanical properties cannot be fully utilized. Thus, it is preferable to improve the shape conformability by employing incised prepregs in which incisions are formed. However, the mechanical properties of an incised prepreg vary depending on the shape or the arrangement pattern of the incisions. For example, the shorter the length of incisions (hereinafter sometimes referred to as the incision length) or the longer the length of reinforcing fibers divided by incisions (hereinafter sometimes referred to as the fiber length), the lower the knock-down from the mechanical properties of the original prepreg is and the higher the mechanical properties it has.

Therefore, in the incised prepregs a in the tape-shaped substrate A in the present invention, it is preferable that the average length xa (mm) of the incisions and the average length ya (mm) of the reinforcing fibers divided by the incisions satisfy ya>6.0xa+10 (hereinafter referred to as condition 1). Condition 1 means that it is preferable that the longer the average length xa of the incisions, the longer the average length ya of the reinforcing fibers, and when the average length ya of the reinforcing fibers is short, it is preferable that the average length xa of the incisions is shorter. When the condition 1 is satisfied, it is preferable especially that ya be 20 mm or more because high mechanical properties are exhibited.

The average length of incisions in the present invention means the average value of the lengths of all the incisions formed in an incised prepreg, but since it is impractical to actually measure the lengths of all the incisions, the average value determined from the values measured using an image taken by photographing the incised prepreg using an imaging device such as a digital microscope is taken as the average length of the incisions. The pattern of incisions can be extracted by connecting the ends of an incision on the obtained image by a line segment. Then, the length of the line segment is taken as the length of the incision, the lengths of 10 incisions in total are measured, and the average value thereof is taken as the average length of incisions. Incisions may be either linear or curved, but when an incision is curved, the length of the line segment connecting the ends of the incision is taken as the length of the incision.

Similarly, the average length of reinforcing fibers in the present invention also means the average value of the lengths of all the reinforcing fibers in an incised prepreg, but since it is impractical to actually measure the lengths of all the reinforcing fibers, the average value determined from the values measured using an image taken by photographing by use of an imaging device such as a digital microscope in the same manner as for the average length of incisions is taken as the average length of the reinforcing fibers. On the image, for each of two incisions adjacent in the orientation direction of the reinforcing fibers, the ends of an incision are connected by a line segment, and an incised pattern is extracted. Then, the distance between the line segments parallel to the orientation direction of the reinforcing fiber is taken as the length of the reinforcing fiber, and the length of the reinforcing fiber is measured for 10 line segments in total, and the average value thereof is taken as the average length of the reinforcing fiber.

In order to entirely reinforce the sheet substrate B, which serves as a base material, it is preferable to attain the reinforcement using a plurality of tape-shaped substrates A, and in order to efficiently transmit a stress between the tape-shaped substrates A, it is preferable to place the tape-shaped substrates A on a mold such that they have an overlapping portion where they overlap and a non-overlapping portion where they do not overlap as depicted in FIG. 1. That is, the placement step (A) in the present invention is a step of placing a plurality of tape-shaped substrates A on a mold such that each of the tape-shaped substrates A forms an overlapping portion in which the tape-shaped substrate A overlaps one or more other tape-shaped substrates A and a non-overlapping portion in which the tape-shaped substrate A does not overlap any other tape-shaped substrates A.

The sheet substrate B to be used for the present invention 1 is a substrate including randomly oriented reinforcing fibers and a resin. Examples of such a sheet substrate B include a substrate in which reinforcing fiber bundles having a length of about 10 to 50 mm are randomly arranged, such as an SMC (sheet molding compound) and a substrate in which individual fibers are randomly arranged. The amount of the sheet substrate B charged into the mold may be adjusted by appropriately laminating sheet substrates B according to the volume of the fiber-reinforced plastic to be molded. That is, the placement step (B) in the present invention is a step of placing a sheet substrate B on a mold, and the number and size of the sheet substrate B to be used in the placement step (B) may be appropriately chosen according to the object to be molded.

The order of performing the placement step (A) and the placement step (B) is not particularly limited and either of them may be performed first. Moreover, the tape-shaped substrates A and the sheet substrate B may be placed simultaneously, that is, it is possible to perform the placement step (A) and the placement step (B) simultaneously in a single step.

The molding step in the present invention 1 is a step of heating and pressing the tape-shaped substrates A and the sheet substrate B placed. That is, in the molding step, in order to integrate the tape-shaped substrates A and the sheet substrate B placed via the placement steps (A) and (B), heating and pressing thereof are performed and a fiber-reinforced plastic having a complicated shape is thereby produced. The means for heating and pressing in the molding step may be, for example, press molding.

The present invention 2 is an embodiment in which a sheet substrate C is used instead of the sheet substrate B in the present invention 1. The sheet substrate C herein is a substrate including one or more incised prepregs c. The incised prepreg c is a prepreg including unidirectionally oriented reinforcing fibers and a resin and having a plurality of incisions dividing the reinforcing fibers formed in the prepreg, and it satisfies the condition 2 described below. The sheet substrate C is a substrate including one or more incised prepregs c as described above, and it is preferably a substrate including a plurality of incised prepregs c. Typical lamination structures of the incised prepregs c in the sheet substrate C may be a quasi-isotropic lamination structure like $[+45°/0°/-45°/90°]_{2s}$ where the orientation direction of the reinforcing fibers is 0° and a cross-ply lamination structure like $[0°/90°]_2$, but not limited to those and the incised prepregs c may be arbitrarily laminated depending on the application.

Preferably, the incised pattern of the incised prepreg c is an incised pattern opposite to that of the incised prepreg a for which mechanical properties are important in order to provide the incised prepreg c with flowability sufficient for loading it to edges of a mold having a complicated shape. That is, it is preferable in the incised prepregs c that the average length xc (mm) of the incisions and the average length yc (mm) of the reinforcing fibers divided by the incisions satisfy yc>6.0xc+10 (hereinafter referred to as condition 2). When the condition 2 is satisfied, it is preferable especially that yc be smaller than 20 mm especially in order to improve flowability.

The present invention 2 is a method for producing a fiber-reinforced plastic including a placement step (A) of placing a plurality of tape-shaped substrates A on a mold such that each of the tape-shaped substrates A forms an overlapping portion in which the tape-shaped substrate A overlaps one or more other tape-shaped substrates A and a non-overlapping portion in which the tape-shaped substrate A does not overlap any other tape-shaped substrates A, a placement step (C) of placing a sheet substrate (C) on the mold, and a molding step of heating and pressing the tape-shaped substrates A and the sheet substrate C placed. The placement step (A) is the same step as that described in the present invention 1.

The placement step (C) in the present invention 2 is a step of placing a sheet substrate C on a mold, and the number and size of the sheet substrate C to be used in the placement step (C) as in the placement step (B) may be appropriately chosen according to the object to be molded.

Moreover, the molding step in the present invention 2 is a step of heating and pressing the tape-shaped substrates A and the sheet substrate C placed. That is, like the molding step in the present invention 1, in the molding step in the present invention 2, in order to integrate the tape-shaped substrates A and the sheet substrate C placed via the placement steps (A) and (C), heating and pressing thereof are performed by press molding and a fiber-reinforced plastic having a complicated shape is thereby produced.

The order of performing the placement step (A) and the placement step (C) is not particularly limited and either of them may be performed first. Moreover, the tape-shaped substrates A and the sheet substrate C may be placed simultaneously, that is, it is possible to perform the placement step (A) and the placement step (C) simultaneously in a single step.

While the present invention 1 is characterized by including the above-described placement step (A), placement step (B), and molding step, and the present invention 2 is characterized by including the above-described placement step (A), placement step (C), and molding step, the substrates to be fed into the mold during the placement step (A), the placement step (B) and the placement step (C) are not limited to the tape-shaped substrates A, the sheet substrate B or the sheet substrate C, and a resin, a paint, or the like for improving the surface quality may be placed if necessary.

Although both the sheet substrate B and the sheet substrate C are substrates having favorable flowability, the production method of the present invention 1 using the sheet substrate B is advantageous when importance is placed on the cost. Instead, since the use of the sheet substrate C makes finer the fine irregularities on the surface of a fiber-reinforced plastic due to the inclusion of short fibers, the fiber-reinforced plastic obtained by using the present invention 2 is advantageous in terms of surface quality. Therefore, it is preferable to select one of the sheet substrates, that is, to select the present invention 1 or the present invention 2, according to the balance of cost and quality required. Alternatively, it is also possible to choose a structure of reinforcing the tape-shaped substrate A by using the sheet substrate B and the sheet substrate C in combination.

In the present invention, the reinforcing fibers to be applied to the tape-shaped substrate A, the sheet substrate B, and the sheet substrate C, that is, the reinforcing fibers in the incised prepreg a, the reinforcing fibers in the sheet substrate B, and the reinforcing fibers in the incised prepreg c are not particularly limited, and they may be glass fibers, Kevlar fibers, carbon fibers, graphite fibers, boron fibers, or the like. Different reinforcing fibers may be used for the tape-shaped substrate A (the incised prepreg a), the sheet substrate B, and the sheet substrate C (the incised prepreg c). Among these, carbon fibers are preferable from the viewpoint of specific strength and specific elastic modulus.

The resin with which the reinforcing fibers are to be impregnated, that is, the resin in the incised prepreg a, the resin in the sheet substrate B, and the resin in the incised prepreg c are not particularly limited and may be either a thermoplastic resin or a thermosetting resin. Different resins may be used for the tape-shaped substrate A (the incised prepreg a), the sheet substrate B, and the sheet substrate C (the incised prepreg c).

Examples of the thermoplastic resin include polyamide (PA), polyacetal, polyacrylate, polysulfone, ABS, polyester, acryl, polybutylene terephthalate (PBT), polycarbonate (PC), polyethylene terephthalate (PET), polyethylene, polypropylene, polyphenylene sulfide (PPS), polyether ether ketone (PEEK), polyether imide (PEI), polyether ketone ketone (PEKK), liquid crystal polymers, polyvinyl chloride, fluororesins, such as polytetrafluoroethylene, and silicone.

Examples of such thermosetting resin include unsaturated polyester resin, vinyl ester resin, epoxy resin, benzoxazine resin, phenol resin, urea resin, melamine resin, and polyimide resin. Modified forms of such resins and blends of two or more resins may also be used. Further, the thermosetting resins may be resins which are self-cured by heat or may be those contain a curing agent, a curing accelerator, or the like. The thermosetting resins also may be those in which a filler or the like is mixed for the purpose of improving heat resistance and mechanical properties.

There are no particular limitations on the volume content (Vf) of reinforcing fibers in the incised prepreg a and the incised prepreg c, which can be chosen as appropriate, but in order that the incised prepreg a exhibits sufficient mechanical properties, Vf=50 to 65% is preferable, and in order that the incised prepreg c exhibits sufficient flowability, Vf=40 to 60% is preferable. For the SMC or the like constituting the sheet substrate B also, the Vf is preferably as low as possible when sufficient flowability is to be exhibited, and a specific range thereof is preferably Vf=30 to 50%.

Regarding methods for producing the incised prepreg a and the incised prepreg c, that is, a method of forming a plurality of incisions that divide reinforcing fibers in a prepreg including unidirectionally oriented reinforcing fibers and a resin, they may be produced by pressing a prepreg against a rotary blade provided with a blade on the surface thereof, or may be produced by intermittently pressing a prepreg using a Thomson blade, or may be produced using a laser.

In the present invention, in the incised prepreg a and the incised prepreg c, it is preferable that substantially all of the reinforcing fibers in the incised prepreg be divided by incisions. The phrase that substantially all of the reinforcing fibers in the incised prepreg are divided by incisions means that continuous fibers accounting for 95% or more of the reinforcing fibers (continuous fibers) before being divided are divided by incisions (the same applies hereinafter).

As a method for confirming whether or not substantially all reinforcing fibers in an incised prepreg are divided by incisions, since it is impractical to confirm by measuring the entire area of the incised prepreg, confirmation is made by extracting a 10 mm-wide sample as a representative and considering reinforcing fibers having a length of 100 mm or more as continuous fibers. First, a small piece sized 10 mm by 10 mm of a single incised prepreg layer is cut out from an arbitrary position and then is cured, and a cross section thereof perpendicular to the orientation direction of the reinforcing fibers is ground, and an image of the cross section is obtained. Then, reinforcing fiber portions and resin portions are binarized by image processing, and the number (N1) of the reinforcing fibers included in the cross section is counted. Next, the incised prepreg is cut into a size of 200 mm by 10 mm such that the length in the orientation direction of the reinforcing fibers is 200 mm, and the resin is baked out at a high temperature (a baking out method). The temperature for baking out the resin varies depending on the resin type, and for example, it is 500° C. for an epoxy resin. Then, of the remaining reinforcing fibers, the number (N2) of reinforcing fibers having a length of 100 mm or more is counted. When N2 is 5% or less of N1, it is considered that continuous fibers in an amount of 95% of the continuous fibers before being divided are divided by incisions.

Preferred embodiments of the present invention 2 include a method for producing a fiber-reinforced plastic, wherein when the sheet substrate C includes two incised prepregs c with their orientation directions of reinforcing fibers perpendicularly intersecting each other, in the placement step (C), two or more sheet substrates C are placed on the mold such that any of them overlap one or more of the other sheet substrates C. When the fiber-reinforced plastic to be molded is relatively large, it is preferable to place the sheet substrate C on a mold while dividing the sheet substrate into a size smaller than 0.5 m$^2$ so as to be easily handled manually, and when, in the placement step (C) of placing a plurality of sheet substrates C, the sheet substrates C are placed apart, and if there is formed a weld line where sheet substrates C that have flowed are in contact with each other, there is a risk that the mechanical properties will be greatly reduced at that location. Therefore, when placing a plurality of sheet substrates C, it is preferable to place them while overlapping them at least partly and produce a fiber-reinforced plastic while forming a mixed region of different sheet substrates C. Each of two or more sheet substrates C overlaps one or more other sheet substrates C such that, when the sheet substrates C are in a parallelogram shape, each of the sheet substrates C is placed with one side thereof overlapping another sheet substrate C by about 10 to 50 mm Further, when sheet substrates C are placed in an overlapping manner, the sheet substrates C preferably include two incised prepregs c whose orientation directions of reinforcing fibers perpendicularly intersect each other in order to make a mixed region contain reinforcing fibers oriented in multiple directions to improve mechanical properties.

Preferred embodiments of the present invention 2 include an embodiment where the average length of the incisions of the incised prepreg c in the sheet substrate C is 1.5 or more times the average length of the incisions of the incised prepreg a. In the fiber-reinforced plastic produced in the present invention, the tape-shaped substrates A play a role of reinforcement, but it is preferable that the sheet substrate C also have high mechanical properties as far as possible. Therefore, in a conceivable method, the flowability of the incised prepreg c is made higher than that of the incised prepreg a while the fiber lengths of the incised prepreg a and the incised prepreg c are made equal or almost equal. At this time, even when the incised prepreg a satisfies the condition 1 and the incised prepreg c satisfies the condition 2, the incised prepreg c can be made to have a higher flowability by adjusting the average length of the incisions formed in the incised prepreg c to 1.5 or more times the average length of the incisions formed in the incised prepreg a. More preferably, the average length of the incisions formed in the incised prepreg c is adjusted to 2.0 or more times the average length of the incisions formed in the incised prepreg a. The upper limit of the average length of the incisions formed in the incised prepreg c is not particularly limited, but a practical upper limit is 100 times the average length of the incisions formed in the incised prepreg a.

Preferred embodiments of the present invention 2 include an embodiment where when a circle with a radius of 5 mm is extracted at an arbitrary position in the plane of the incised prepreg c, 13 or more incisions are included in the circle. The phrase that an incision is included in the circle refers to a state where the entire incision is included in the circle. In order to further improve the flowability of the incised prepreg c, it is effective to shorten the fiber length, but by dispersing incisions more finely while satisfying the condition 2. In addition to it, it is possible to improve the flowability while maintaining the orientation of the individual reinforcing fibers during flowing without significantly deteriorating mechanical properties. Further, by finely dispersing the incisions, the openings of the individual incisions can be reduced, and the surface quality of a resulting fiber-reinforced plastic can also be improved.

Figure 2:
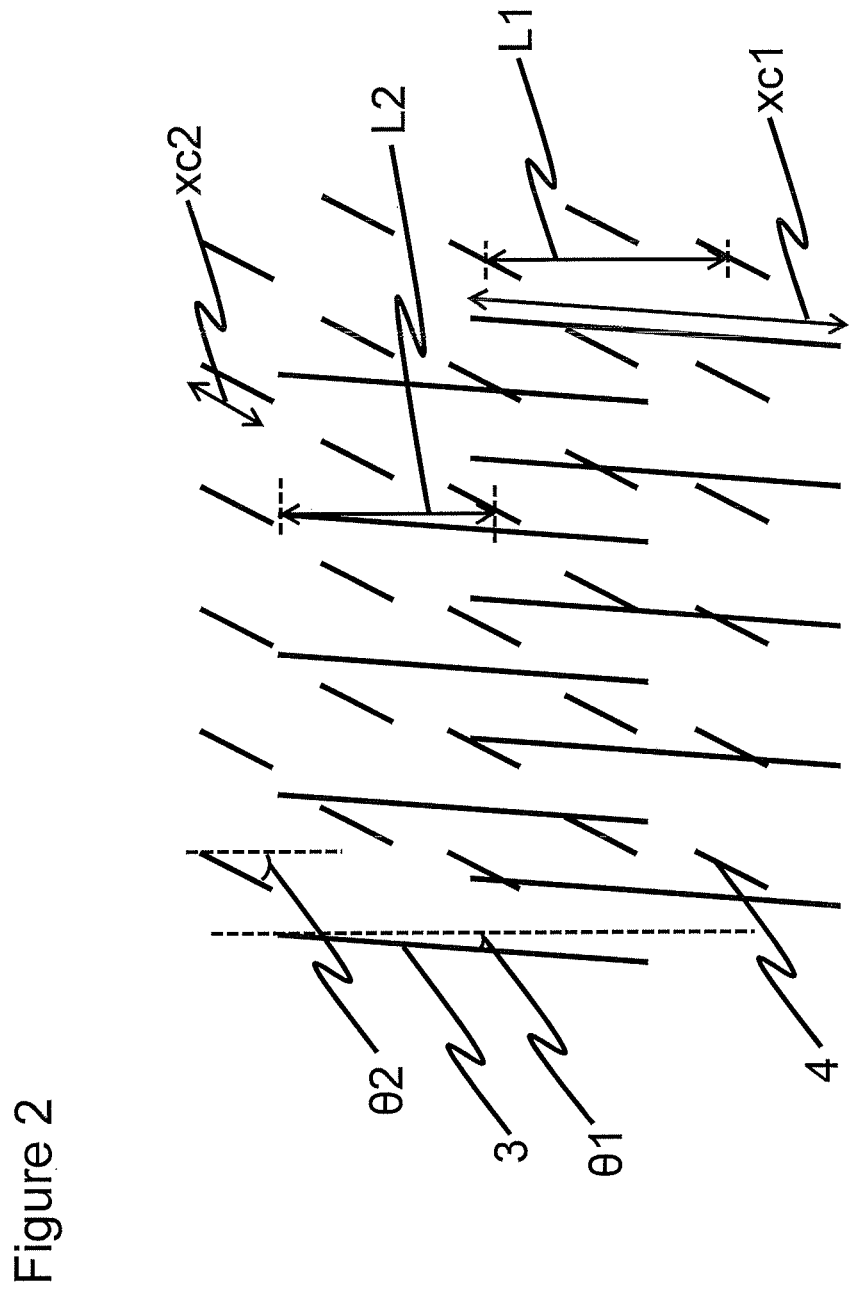
FIG. 2 is an example of an incised pattern of an incised prepreg c.

Preferred embodiments of the present invention include an embodiment where in the sheet substrate C, as shown in FIG. 2, incisions 1 (sign 3) and incisions 2 (sign 4) are formed in a incised prepreg c, and the incisions 1 form an angle $\theta 1$ with the fiber direction of reinforcing fibers, the absolute value of the angle $\theta 1$ satisfying $0°\leq\theta 1<10°$, and the average length xc1 of the incisions satisfies $5\ mm \leq xc1 \leq 50\ mm$, and the incisions 2 form an angle $\theta 2$ with the fiber direction of reinforcing fibers, the absolute value of the angle $\theta 2$ satisfying $10°<\theta 2 \leq 45°$, and the average length xc2 of the incisions satisfies $0.5\ mm \leq xc2 < 5\ mm$, and substantially all reinforcing fibers in the incised prepreg c are divided by the incisions 1 or the incisions 2, and the length of the reinforcing fibers divided is 0.1 to 15 mm. There is a possibility that the fiber length is shorter than 0.1 mm in the vicinity of the intersections of the incisions 1 and the incisions 2, but in the present invention, the presence of reinforcing fibers shorter than 0.1 mm is considered negligible when such fibers account for less than 5% of the volume of all the reinforcing fibers contained in the incised prepreg c.

Regarding the method for confirming that the length of a reinforcing fiber is 0.1 to 15 mm, that can be confirmed using an image photographed using a digital microscope or the like as for the above-described average length of the reinforcing fibers. When reinforcing fibers are divided only by incisions 1 or incisions 2, the distance L1 between incisions adjacent along the orientation direction of the reinforcing fibers is measured, and as to reinforcing fibers divided by the incisions 1 and 2, the maximum value L2 of the lengths of the reinforcing fibers sandwiched between the incisions 1 and the incisions 2 is measured. L1 and L2 are each measured at ten positions, and when L1 and L2 are 15 mm or less, the length of the reinforcing fibers is considered to be 0.1 to 15 mm.

In order to improve the flowability of the incised prepreg c in which incisions 2 are formed without significant deterioration of mechanical properties, it is effective to form incisions 1 having an angle infinitely close to 0° with the fiber direction of the reinforcing fibers. In the incised prepreg c, the smaller the angle $\theta 1$, the smaller the decrease in mechanical properties from the prepreg before the incisions formation, and therefore, there occurs little decrease in mechanical properties from the incised prepreg c having only incisions 2 formed and the number of incisions formed can be increased by forming the incisions 1 in the incised prepreg in which the incisions 2 have been formed. Increasing the number of incisions formed leads to increase in the number of sites where reinforcing fibers adjoining via incisions slip, so that flowability is improved. A particularly preferable range of xc1 is $5\ mm \leq xc1 \leq 10\ mm$. Although the incision 1 is effective even if it is an incision parallel to reinforcing fibers, it is particularly preferable to be an incision dividing reinforcing fibers, and it is preferable that $1°\leq\theta 1<10°$. The incisions 1 and the incisions 2 may be formed in separate steps to produce an incised prepreg c.

In a possible preferred embodiment of the present invention, in the placement step (A), the ratio of the total area of the overlapping portion to the total area of the non-overlapping portion ("the total area of the overlapping portion"/"the total area of the non-overlapping portion") is 0.05 to 0.8. If the area of the non-overlapping portion is excessively small, the loads acting on the tape-shaped substrates A will be difficult to transmit, so that the reinforcing effect will be weak. In contrast, if the area of the overlapping portion is excessively large, the tape-shaped substrates A which are higher in rigidity than the sheet substrate B or the sheet substrate C may not conform with a complicated shape and a resulting fiber-reinforced plastic may be blurred. Therefore, it is important to place the tape-shaped substrates A on the mold such that the proportion of the area of the overlapping portion to the area of the non-overlapping portion is appropriate. A further preferable ratio of the total area of the overlapping portion to the total area of the non-overlapping portion is 0.1 to 0.6.

Preferred embodiments of the present invention include an embodiment where tape-shaped substrates A are placed such that, of the two tape-shaped substrates A forming the overlapping portion by overlapping together, the fiber direction of the reinforcing fibers in the incised prepreg a located on the overlapping portion side of one tape-shaped substrate A differed from the fiber direction of the reinforcing fibers in the incised prepreg a located on the overlapping portion of the other tape-shaped substrate A and both the fiber directions intersect. That, of the two tape-shaped substrates A, the fiber direction of the reinforcing fibers in the incised prepreg a located on the overlapping portion side of one tape-shaped substrate A differed from the fiber direction of the reinforcing fibers in the incised prepreg a located on the overlapping portion side of the other tape-shaped substrate A and both the fiber directions intersect means the case where in the two incised prepregs a forming the overlapping portion, of the angles formed by the fiber direction of the reinforcing fibers of one incised prepreg a and the fiber direction of the reinforcing fibers of the other incised prepreg a, the smaller angle is 5° or more. It is preferable that the fiber directions of the reinforcing fibers of the two incised prepregs a forming the overlapping portion be different from each other because this leads to an increased friction between the incised prepregs a in the overlapping portion and the position of the tape-shaped substrates A hardly shifts also during molding into a complicated shape.

Preferred embodiments of the present invention include an embodiment wherein the tape-shaped substrate A includes three or more sheets of the incised prepreg a, including an incised prepreg a in which reinforcing fibers are oriented in the longitudinal direction of the tape-shaped substrate A, an incised prepreg a in which reinforcing fibers are oriented at 40 to 50° with respect to the longitudinal direction of the tape-shaped substrate A, and an incised prepreg a in which reinforcing fibers are oriented at −40 to −50° with respect to the longitudinal direction of the tape-shaped substrate A. In particular, when obtaining a molded product having a relatively small thickness such as 0.1 to 1 mm, the sheet substrate B or the sheet substrate C adjacent in the thickness direction of the tape-shaped substrate A is extruded and there may be generated a portion where the thickness direction is composed only of the tape-shaped substrate A. If all the incised prepregs a included in the tape-shaped substrate A have the same orientation direction of reinforcing fibers, anisotropy undesirably occurs in the rigidity of such a portion. Therefore, in consideration of the possibility of occurrence of a portion where the thickness direction is composed only of the tape-shaped substrate A, it is preferable that the tape-shaped substrate A itself have approximately isotropic rigidity, and therefore, it preferably includes not only an incised prepreg a in which reinforcing fibers are oriented in the longitudinal direction but also at least an incised prepreg a in which reinforcing fibers are oriented at 40 to 50° with respect to the longitudinal direction and an incised prepreg a in which reinforcing fibers are oriented at −40 to −50° with respect to the longitudinal direction of the tape-shaped substrate A. In particular, it is preferable that incised prepregs a oriented at +45° and −45° with respect to the longitudinal direction of the tape-shaped substrate A be included. Furthermore, in order to make the rigidity of the tape-shaped substrate A close to isotropic, it may include an incised prepreg a in which reinforcing fibers are oriented at 90° with respect to the longitudinal direction. The order of lamination of the incised prepregs a is not particularly limited.

EXAMPLES

Hereafter, the present invention will be more specifically described by way of examples, but the present invention is not limited to the inventions described in the examples. In the following examples, tape-shaped substrates A, sheet substrates B, and sheet substrates C were produced using "TORAYCA (registered trademark)" prepreg sheet P3052S-15 (reinforcing fiber: T700S, thermosetting resin: 2500, volumetric content of reinforcing fiber: 58%) (hereinafter, simply called "prepreg" means this prepreg sheet) as a base, and then the moldability evaluation 1, the rigidity evaluation, and the moldability evaluation 2, which are described below, were carried out. The results obtained are summarized in Table 1.

<Moldability Evaluation 1>

Figure 3:
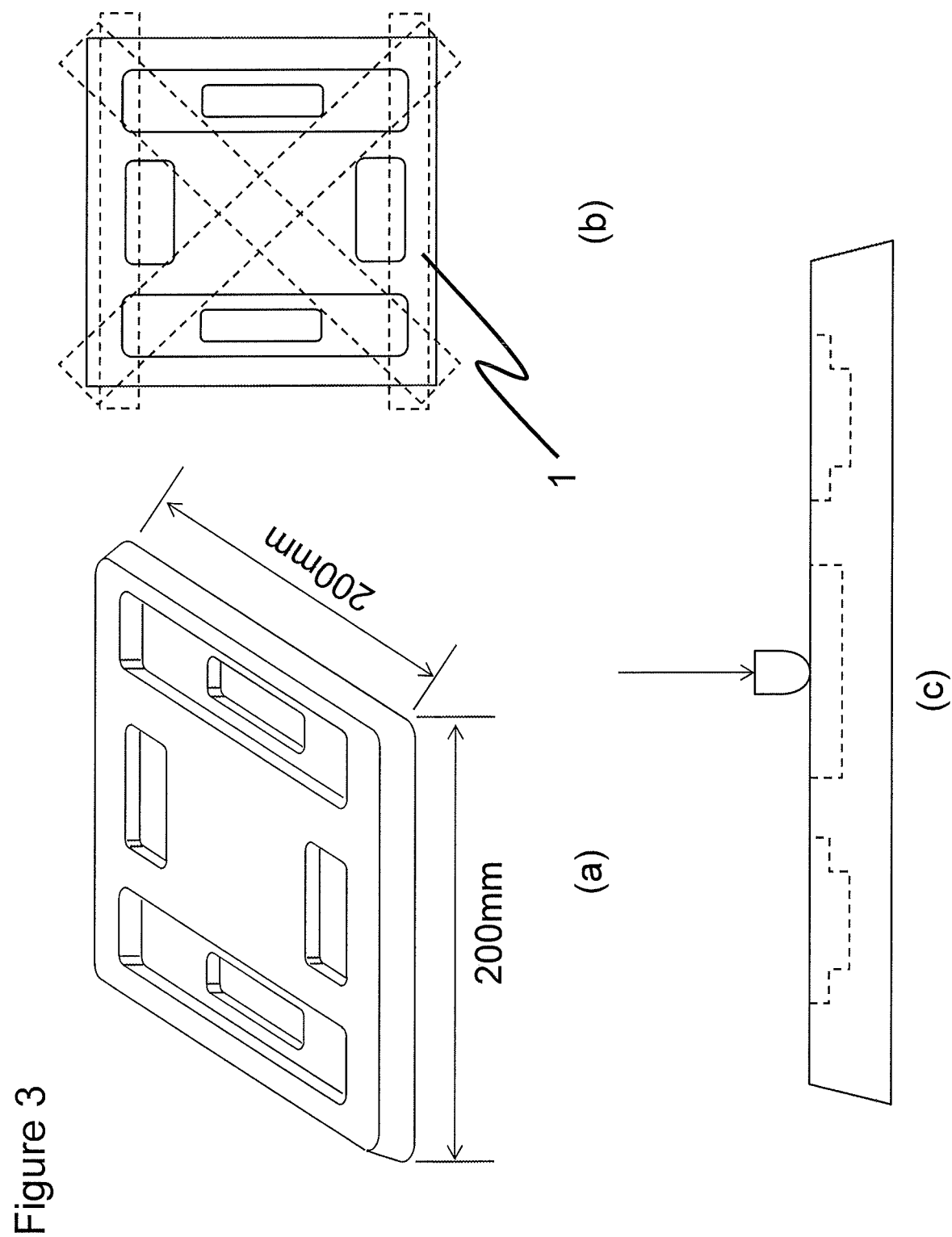
FIG. 3 is an example of shapes of fiber-reinforced plastics produced in Examples.

Using a double-sided mold, a fiber-reinforced plastic having the shape shown in FIG. 3(a) was produced. In the placement step (A) of placing the tape-shaped substrates A on the mold, tape-shaped substrates A with a width of 30 mm were cut into a size as large as they protrude out of the mold, and then those to be placed with tape-shaped substrates A intersecting with each other and those parallel to the opposite sides of a fiber-reinforced plastic were placed on the lower mold heated at 140° C. in advance such that an overlapping portion where tape-shaped substrates A overlapped and a non-overlapping portion where tape-shaped substrates A did not overlap were formed as shown in FIG. 3(b).

The ratio of the total of the area of the overlapping portion to the total of the area of non-overlapping portions satisfied 0.05 to 0.8. Of the two tape-shaped substrates A forming the overlapping portion by overlapping together, the fiber direction of the reinforcing fibers in the incised prepreg a located on the overlapping portion side of one tape-shaped substrate A differed from the fiber direction of the reinforcing fibers in the incised prepreg a located on the overlapping portion side of the other tape-shaped substrate A, and both the fiber directions intersected.

Furthermore, a sheet substrate B or sheet substrate C with a thickness of about 1 mm was cut into a size of 200 mm by 200 mm and was placed on the mold. Then, the upper mold heated at 140° C. in advance was placed, and pressure was applied at a pressure of 6 MPa against the area of 200 mm by 200 mm by using a pressing machine, and after holding for 30 minutes, the product was released from the mold and, thus, a fiber-reinforced plastic was obtained. The quality of the fiber-reinforced plastic obtained was evaluated according to the following four-stage criteria. A fiber-reinforced plastic was placed on a flat desk, and if there was a portion where the edge raised 1 mm or more, it was considered that warpage had occurred, and if there was a step that could be easily detected by hand touch, irregularities were considered to have occurred.

A: There was neither warpage nor irregularities, and good surface quality was obtained.

B: Warpage occurred, but there were no irregularities and the surface quality was good.

C: Irregularities are generated between a tape-shaped substrate A and the sheet substrate B or the sheet substrate C.

D: A resin staving resulting from the state where a substrate is not in contact with a mold is observed.

<Rigidity Evaluation>

For a fiber-reinforced plastic with a moldability evaluation 1 of A or B among the fiber-reinforced plastics obtained in the moldability evaluation 1, the rigidity thereof was evaluated by pressing the center of the fiber-reinforced plastic at a rate of 1 ram/min with an iron indenter with a hemispherical tip with 30 mm in diameter using a mechanical tester as shown in FIG. 3(c). In the evaluation method, $E=40/(h^3 \times (s2-s1))$ was obtained as an evaluation index using a displacement s1 at which the test force was 40 N, a displacement s2 at which the test force was 80 N, and a thickness h (mm) immediately below the indenter of the fiber-reinforced plastic.

<Moldability Evaluation 2>

Figure 4:
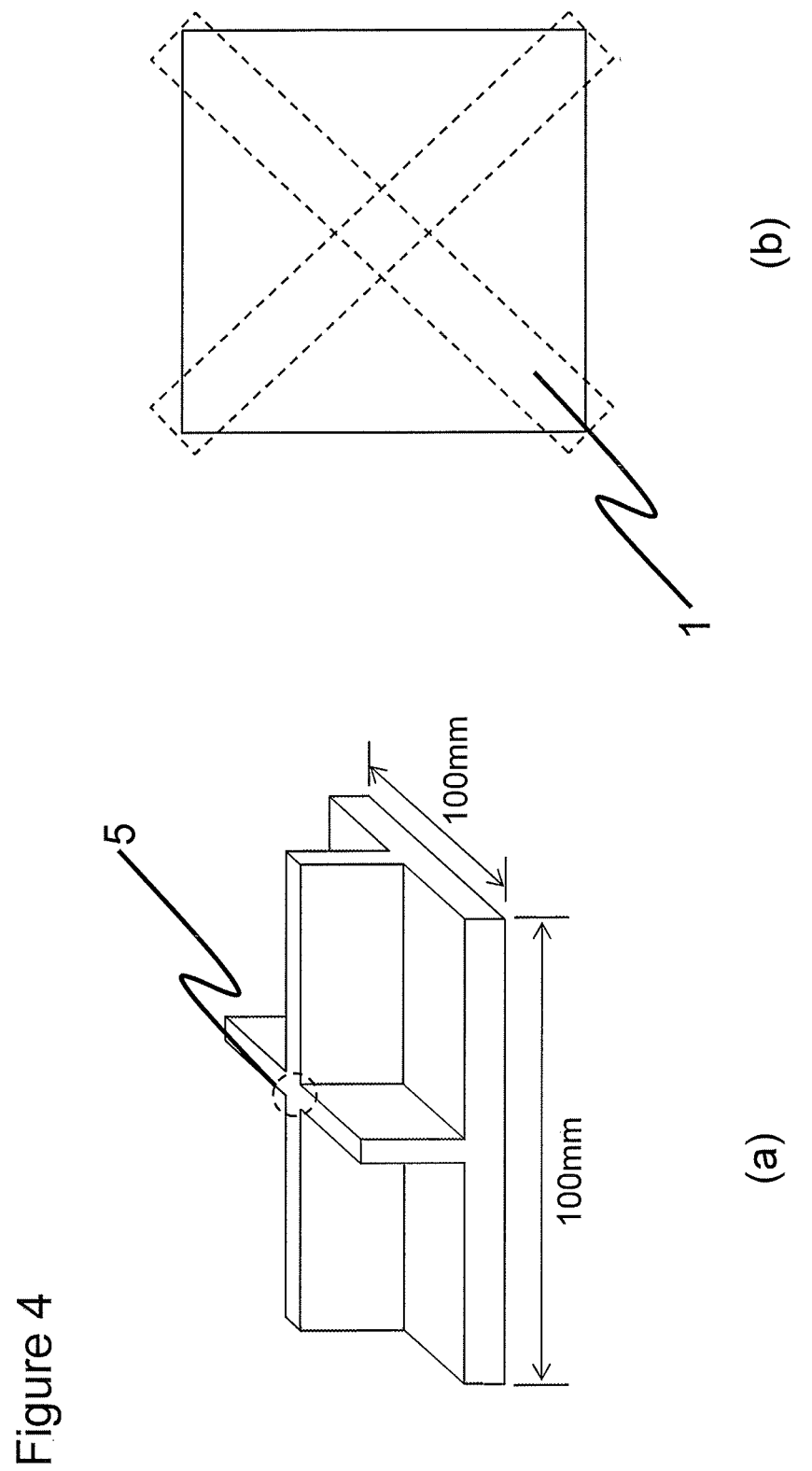
FIG. 4 is an example of shapes of fiber-reinforced plastics produced in Examples.

Using a double-sided mold, a fiber-reinforced plastic having the shape shown in FIG. 4(a) was produced. With the double-sided mold used, a 1.8 mm-thick cruciform rib having a height of up to 45 mm can be formed. In the placement step (A) of placing the tape-shaped substrates A on the mold, tape-shaped substrates A with a width of 10 mm were cut into a size as large as they protrude out of the mold, and then the tape-shaped substrates A were placed so as to intersect with each other as shown in FIG. 4(b) and they were placed on the lower mold heated at 140° C. in advance such that an overlapping portion where tape-shaped substrates A overlapped and a non-overlapping portion where tape-shaped substrates A did not overlap were formed. Furthermore, a sheet substrate B or sheet substrate C with a thickness of about 3 mm was cut into a size of 100 mm by 100 mm and was placed on the mold. Then, the upper mold heated at 140° C. in advance was placed, and pressure was applied at a pressure of 6 MPa against the area of 100 mm by 100 mm by using a pressing machine, and after holding for 20 minutes, the product was released from the mold and, thus, a fiber-reinforced plastic was obtained. The height of the rib central portion (the area with sign 5) obtained was evaluated according to the following five-stage criteria.

S: The rib containing carbon fibers had a height of 40 mm or more.

A: The rib containing carbon fibers had a height of 30 mm or more and less than 40 mm.

B: The rib containing carbon fibers had a height of 20 mm or more and less than 30 mm.

C: The rib containing carbon fibers had a height of 10 mm or more and less than 20 mm.

D: The rib containing carbon fibers had a height of less than 10 mm.

Example 1

The tape-shaped substrate A was a substrate in which three layers of incised prepreg a were laminated in [+45°/0°/−45°] where the longitudinal direction of the taped-shaped substrate was taken as 0°. Incised prepregs a were produced by forming incisions in prepregs using a blade such that the incisions had a length of 1 mm, the incisions formed an angle of 14° with respect to the longitudinal direction of the tape-shaped substrates A, and the average length of all reinforcing fibers was 25 mm. The average length xa of the incisions was 1 mm, the average length ya of the reinforcing fibers divided by the incision was 25 mm, and xa and ya satisfied the condition 1 of ya>6.0xa+10. The number of the continuous fibers in the incised prepreg a was measured to be 0 (zero) using the above-described baking out method, so that it was confirmed that substantially all the reinforcing fibers were divided by incisions.

As a sheet substrate B, there was used an SMC produced by cutting chopped strands having a length in the longitudinal direction of 25 mm and a width of 5 mm from a prepreg, heating it to 70° C. in a mold, and vacuum sucking. The thickness was 1 mm.

In the moldability evaluation 1, one sheet substrate B was placed in the placement step (B). Although the resulting fiber-reinforced plastic was slightly warped, there was no noticeable molding failure. In the rigidity evaluation, E was 14. In the placement step (B) of the moldability evaluation 2, three sheet substrates B were laminated, and a 21 mm rib stood on the fiber-reinforced plastic.

Example 2

A fiber-reinforced plastic was produced in the same manner as in Example 1 except that the sheet substrate C was used instead of the sheet substrate B. The sheet substrate C was adjusted to 0.9 mm in thickness by laminating incised prepregs c in a lamination structure of [0/90]$_3$. Incised prepregs c were produced by forming incisions in prepregs using a blade such that the incisions had an average length of 1 mm, the incisions formed an angle of 14° with respect to the orientation direction of the reinforcing fibers, and the average length of all reinforcing fibers was 12.5 mm. The average length xc of the incisions was 1 mm, the average length yc of the reinforcing fibers divided by the incision was 12.5 mm, and xc and yc satisfied the condition 2 of yc≤6.0xc+10. Moreover, when a circle with a radius of 5 mm was extracted at an arbitrary position in the plane of the incised prepreg c, 13 or more incisions were included in the circle. The number of the continuous fibers in the incised prepreg c was measured to be 0 (zero) using the above-described baking out method, so that it was confirmed that substantially all the reinforcing fibers were divided by incisions.

In the moldability evaluation 1, one sheet substrate C was placed in the placement step (C). The resulting fiber-reinforced plastic was free of warpage and irregularities and there was no noticeable molding failure. In addition, the disorder of the orientation of the reinforcing fibers and the openings of the incisions were also small. In the rigidity evaluation, E was larger than that of Example 1. In the placement step (C) of the moldability evaluation 2, three sheet substrates C were laminated, and a 35 mm rib stood on the fiber-reinforced plastic.

Example 3

A fiber-reinforced plastic was produced in the same manner as in Example 2 except that the incised prepregs c were exchanged to incised prepregs c produced by forming incisions in prepregs using a blade such that the incisions had a length of 3 mm, the incisions formed an angle of 14° with respect to the orientation direction of the reinforcing fibers, and the average length of all reinforcing fibers was 25 mm. The average length xc of the incisions was 3 mm, the average length yc of the reinforcing fibers divided by the incision was 25 mm, and xc and yc satisfied the condition 2 of yc≤6.0xc+10. xc was 1.5 or more times the average length of the incisions of the incised prepreg a.

In the moldability evaluation 1, the resulting fiber-reinforced plastic was free of warpage and irregularities and there was no noticeable molding failure. The disorder of the orientation of reinforcing fibers and the openings of the incisions appeared to be larger than those in Example 2, but in the rigidity evaluation, E was slightly larger than that in Example 2. In the placement step (C) of the moldability evaluation 2, three sheet substrates C were laminated, and a 25 mm rib stood on the fiber-reinforced plastic.

Example 4

In the moldability evaluation 1, four sheet substrates C sized 100 mm by 100 mm were placed such that the ends overlapped by 10 mm in the placement step (C), and a fiber-reinforced plastic was produced in the same manner as in Example 2. Moldability evaluation 2 was not performed.

In the moldability evaluation 1, the joints were smooth and joining was achieved without irregularities. The rigidity was also equivalent to that of Example 2.

Example 5

In the moldability evaluation 1, four sheet substrates C sized 100 mm by 100 mm were prepared as in Example 4 but they were placed such that their ends did not overlap in the placement step (C), and a fiber-reinforced plastic was produced in the same manner as in Example 2. Moldability evaluation 2 was not performed.

In the moldability evaluation 1, the joints were smooth and joining was achieved without irregularities, but a slight crack grew as the specimen was pushed with an indenter.

Example 6

Although the incised prepreg c used in Example 2 had incisions 2 which formed an angle θ2 with the fiber direction of reinforcing fibers, the absolute value of the angle θ2 satisfying 10°<θ2≤45°, and which had an incision length xc2 satisfying 0.5 mm≤xc2<5 mm, incisions 1 which formed an angle θ1 of 2° with the fiber direction of reinforcing fibers, the angle θ1 satisfying 0°θ1<10°, and which had an average incision length xc1 being 20 mm and satisfying 5 mm≤xc1≤50 mm and which were arranged at intervals of 25 mm with respect to the fiber direction of the reinforcing fibers were further formed in an incised prepreg c by using a blade such that 50% of the reinforcing fibers contained in the incised prepreg c were divided by the incisions 1. The average length of the reinforcing fibers contained in the newly produced incised prepreg c satisfied 0.1 to 15 mm. The number of the continuous fibers in the incised prepreg c was measured to be 0 (zero) using the above-described baking out method, so that it was confirmed that substantially all the reinforcing fibers were divided by incisions. Evaluation was performed in the same manner as in Example 2 using this incised prepreg c.

In the moldability evaluation 1, although undulations of reinforcing fibers were observed more than in Example 2, molding was achieved with neither warpage nor irregularities. The rigidity evaluation gave results equivalent to those of Example 2. In the moldability evaluation 2, there was formed a rib that was 42 mm higher than that of Example 2.

Example 7

An incised prepreg c was prepared by providing a prepreg with very fine incisions having an incision length of 1 mm, a fiber length of 2 mm, and an angle of 60° with respect to the fiber direction of the reinforcing fibers. The average length xc of the incisions was 1 mm, the average length yc of the reinforcing fibers divided by the incision was 2 mm, and these satisfied the condition 2 of yc≤6.0xc+10. Moreover, when a circle with a radius of 5 mm was extracted at an arbitrary position in the plane of the incised prepreg c, 13 or more incisions were included in the circle. A fiber-reinforced plastic was produced in the same manner as in Example 1 except that the incised prepreg c was changed.

In the moldability evaluation 1, a surface quality with orientation maintained to some extent was observed though the reinforcing fibers were short, but there were more disorder of the reinforcing fibers than in Example 2. The rigidity evaluation gave lower values than Example 2. In the moldability evaluation 2, high flowability was exhibited and there was formed a rib as high as 45 mm, which was higher than the other examples.

Example 8

A fiber-reinforced plastic was produced in the same manner as in Example 2 except that the lamination structure of the tape-shaped substrate A was changed to [0]$_3$.

In the moldability evaluation 1, there was no noticeable molding failure but warpage was observed. Although no portion formed only of the tape-shaped substrate A in the thickness direction was found, since reinforcing fibers were unidirectionally oriented in the tape-shaped substrate A, it was readily imagined that the anisotropy was locally strong. In the rigidity evaluation, high rigidity was exhibited. In the moldability evaluation 2, the height of the rib equivalent to Example 2 was confirmed.

Comparative Example 1

A fiber-reinforced plastic was produced in the same manner as in Example 1 except that the placement step (A) of placing tape-shaped substrates A was not performed.

In the moldability evaluation 1, molding was able to be performed without causing noticeable defects though some warpage was observed, In the rigidity evaluation, rigidity was deteriorated more than in Example 1. In the moldability evaluation 2, the height of the rib equivalent to Example 1 was obtained.

Comparative Example 2

A fiber-reinforced plastic was produced in the same manner as in Example 1 except that prepregs with no incisions were used for tape-shaped substrates A.

In the moldability evaluation 1, the tape-shaped substrates A failing to conform to fine irregularities stretched, and resin starving was observed in places. Moldability evaluation 2 was not performed.

Comparative Example 3

A fiber-reinforced plastic was produced in the same manner as in Example 2 except that the placement step (A) of placing tape-shaped substrates A was not performed.

In the moldability evaluation 1, molding was able to be performed without causing neither warpage nor noticeable defects. In the rigidity evaluation, rigidity was greatly deteriorated more than Example 2. Moldability evaluation 2 was not performed.

Comparative Example 4

A fiber-reinforced plastic was produced in the same manner as in Example 2 except that the incised prepregs a used for the tape-shaped substrate A were used as the incised prepregs c to constitute the sheet substrate C.

Although no resin starving was observed in the moldability evaluation 1, some irregularities were generated at the boundary between the tape-shaped substrate A and the sheet substrate C. In the moldability evaluation 2, there was formed a 11 mm rib.

Comparative Example 5

A fiber-reinforced plastic was produced in the same manner as in Example 2 except that no tape-shaped substrates A were used and incised prepregs having no incisions were used as the incised prepregs c to constitute a sheet substrate C.

In the moldability evaluation 1, resin starving was observed in places. In the moldability evaluation 2, the rib did not contain carbon fibers and the resin was squeezed out.

TABLE 1

| Examples | Moldability evaluation 1 | Rigidity evaluation | Moldability evaluation 2 |
| --- | --- | --- | --- |
| Example 1 | B | 14 | B |
| Example 2 | A | 19 | A |
| Example 3 | A | 22 | B |
| Example 4 | A | 19 | — |
| Example 5 | A | 17 | — |
| Example 6 | A | 19 | S |
| Example 7 | A | 16 | S |
| Example 8 | B | 28 | A |
| Comparative Example 1 | B | 9 | B |
| Comparative Example 2 | D | — | — |
| Comparative Example 3 | A | 12 | — |
| Comparative Example 4 | C | — | C |
| Comparative Example 5 | D | — | D |

DESCRIPTION OF REFERENCE SIGNS

1: Tape-shaped substrate A
2: Sheet substrate B

3: Incision 1
4: Incision 2
5: Rib central portion

The invention claimed is:

1. A method for producing a rigid fiber-reinforced plastic having a three-dimensional shape using a tape-shaped substrate A and a sheet substrate B,
the tape-shaped substrate A comprising one or more sheets of incised prepreg a,
the incised prepreg a being a prepreg including unidirectionally oriented reinforcing fibers and a resin and having a plurality of incisions dividing the reinforcing fibers formed in the prepreg, and satisfying the following condition 1,
the sheet substrate B being a substrate comprising randomly oriented reinforcing fibers and a resin, wherein
the method for producing a fiber-reinforced plastic comprises:
a placement step (A) of placing a plurality of tape-shaped substrates A on a mold such that each of the tape-shaped substrates A forms an overlapping portion in which the tape substrate A overlaps one or more other tape-shaped substrates A and a non-overlapping portion in which the tape-shaped substrate A does not overlap any other tape-shaped substrates A;
a placement step (B) of placing a sheet substrate B; and
a molding step of heating and pressing the tape-shaped substrates A and the sheet substrate B placed,
(Condition 1)
the average length xa (mm) of the incisions and the average length ya (mm) of the reinforcing fibers divided by the incisions satisfy ya>6.0xa+10;
wherein in the placement step (A), the ratio of the total of the area of the overlapping portion to the total of the area of the non-overlapping portion is 0.05 to 0.8;
thereby producing the rigid fiber-reinforced plastic having a three-dimensional shape.

2. The method for producing a fiber-reinforced plastic according to claim 1, wherein of two of the plurality of tape-shaped substrates A forming the overlapping portion by overlapping together, the fiber direction of the reinforcing fibers in the incised prepreg a located on the overlapping portion side of one of the two tape-shaped substrates A differs from the fiber direction of the reinforcing fibers in the incised prepreg a located on the overlapping portion side of the other of the two tape-shaped substrates A, and both the fiber directions of the two tape-shaped substrates A intersect.

3. The method for producing a fiber-reinforced plastic according to claim 1, wherein the taped-shaped substrate A includes three or more sheets of the incised prepreg a,
including an incised prepreg a in which reinforcing fibers are oriented in a longitudinal direction of the tape-shaped substrate A, an incised prepreg a in which reinforcing fibers are oriented at 40 to 50° with respect to the longitudinal direction of the tape-shaped substrate A, and an incised prepreg a in which reinforcing fibers are oriented at −40 to −50° with respect to the longitudinal direction of the tape-shaped substrate A.

4. A method for producing a rigid fiber-reinforced plastic having a three-dimensional shape using a tape-shaped substrate A and a sheet substrate C,
the tape-shaped substrate A comprising one or more sheets of incised prepreg a,
the incised prepreg a being a prepreg including unidirectionally oriented reinforcing fibers and a resin and having a plurality of incisions dividing the reinforcing fibers formed in the prepreg, and satisfying the following condition 1,
the sheet substrate C being a substrate comprising one or more sheets of incised prepreg c,
the incised prepreg c being a prepreg including unidirectionally oriented reinforcing fibers and a resin and having a plurality of incisions dividing the reinforcing fibers formed in the prepreg, and satisfying the following condition 2, wherein
the method for producing a fiber-reinforced plastic comprises:
a placement step (A) of placing a plurality of tape-shaped substrates A on a mold such that each of the tape-shaped substrates A forms an overlapping portion in which the tape-shaped substrate A overlaps one or more other tape-shaped substrates A and a non-overlapping portion in which the tape-shaped substrate A does not overlap any other tape-shaped substrates A;
a placement step (C) of placing a sheet substrate C; and
a molding step of heating and pressing the tape-shaped substrates A and the sheet substrate C placed,
(Condition 1)
the average length xa (mm) of the incisions and the average length ya (mm) of the reinforcing fibers divided by the incisions satisfy ya>6.0xa+10,
(Condition 2)
the average length xc (mm) of the incisions and the average length yc (mm) of the reinforcing fibers divided by the incisions satisfy yc≤6.0xc+10;
wherein in the placement step (A), the ratio of the total of the area of the overlapping portion to the total of the area of the non-overlapping portion is 0.05 to 0.8;
thereby producing the rigid fiber-reinforced plastic having a three-dimensional shape.

5. The method for producing a fiber-reinforced plastic according to claim 4, wherein the sheet substrate C includes two incised prepregs c with their orientation directions of reinforcing fibers perpendicularly intersecting each other, and
in the placement step (C), two or more sheet substrates C are placed on the mold such that any of them overlap one or more of the other sheet substrates C.

6. The method for producing a fiber-reinforced plastic according to claim 4, wherein the average length of the incisions of the incised prepregs c is 1.5 times or more the average length of the incisions of the incised prepregs a.

7. The method for producing a fiber-reinforced plastic according to claim 4, wherein when a circle with a radius of 5 mm located at an arbitrary position in a plane of the incised prepregs c is extracted, 13 or more incisions are included in the circle.

8. The method for producing a fiber-reinforced plastic according to claim 4, wherein
incisions 1 and incisions 2 are formed in the incised prepreg c,
with the incisions 1, the absolute value of an angle θ1 formed with the fiber direction of the reinforcing fibers satisfies 0°≤θ1≤10°, and the average length xc1 of the incisions satisfies 5 mm≤xc1≤50 mm,
with the incisions 2, the absolute value of an angle θ2 formed with the fiber direction of the reinforcing fibers satisfies 10°<θ2≤45°, and the average length xc2 of the incisions satisfies 0.5 mm≤xc2<5 mm, and substantially all reinforcing fibers contained in the incised prepreg c are divided by the incisions 1 or incisions 2, and the length of the divided reinforced fibers is 0.1 to 15 mm.

9. The method for producing a fiber-reinforced plastic according to claim 4, wherein of the two tape-shaped substrates A forming the overlapping portion by overlapping together, the fiber direction of the reinforcing fibers in the incised prepreg a located on the overlapping portion side of one tape-shaped substrate A differs from the fiber direction of the reinforcing fibers in the incised prepreg a located on the overlapping portion side of the other tape-shaped substrate A, and both the fiber directions intersect.

10. The method for producing a fiber-reinforced plastic according to claim 4, wherein the tape-shaped substrate A includes three or more sheets of the incised prepreg a,
    including an incised prepreg a in which reinforcing fibers are oriented in a longitudinal direction of the tape-shaped substrate A, an incised prepreg a in which reinforcing fibers are oriented at 40 to 50° with respect to the longitudinal direction of the tape-shaped substrate A, and an incised prepreg a in which reinforcing fibers are oriented at −40 to −50° with respect to the longitudinal direction of the tape-shaped substrate A.

* * * * *